United States Patent Office 3,461,060
Patented Aug. 12, 1969

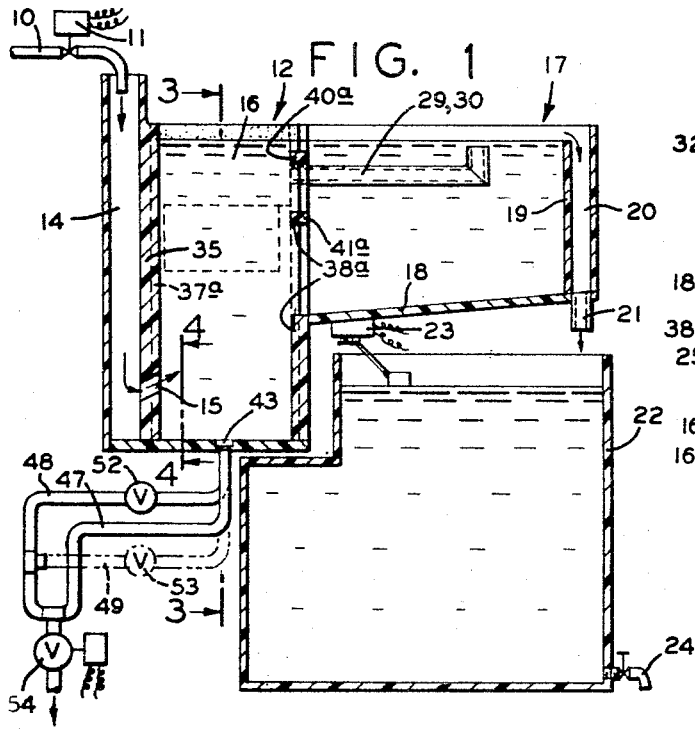
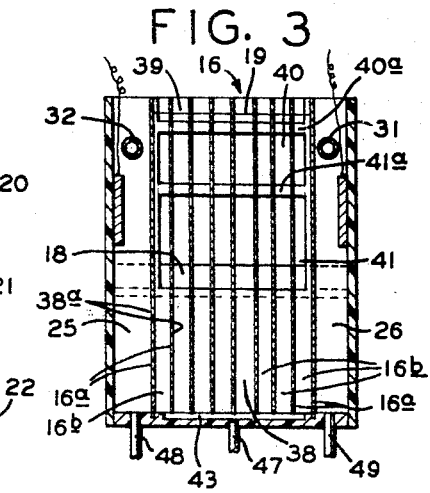
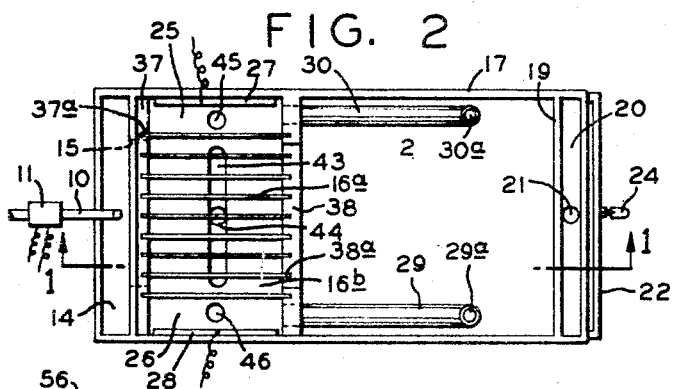
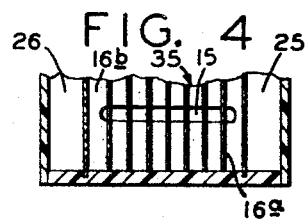
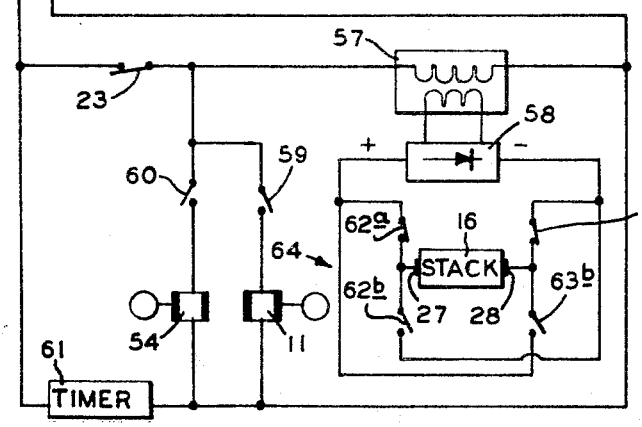

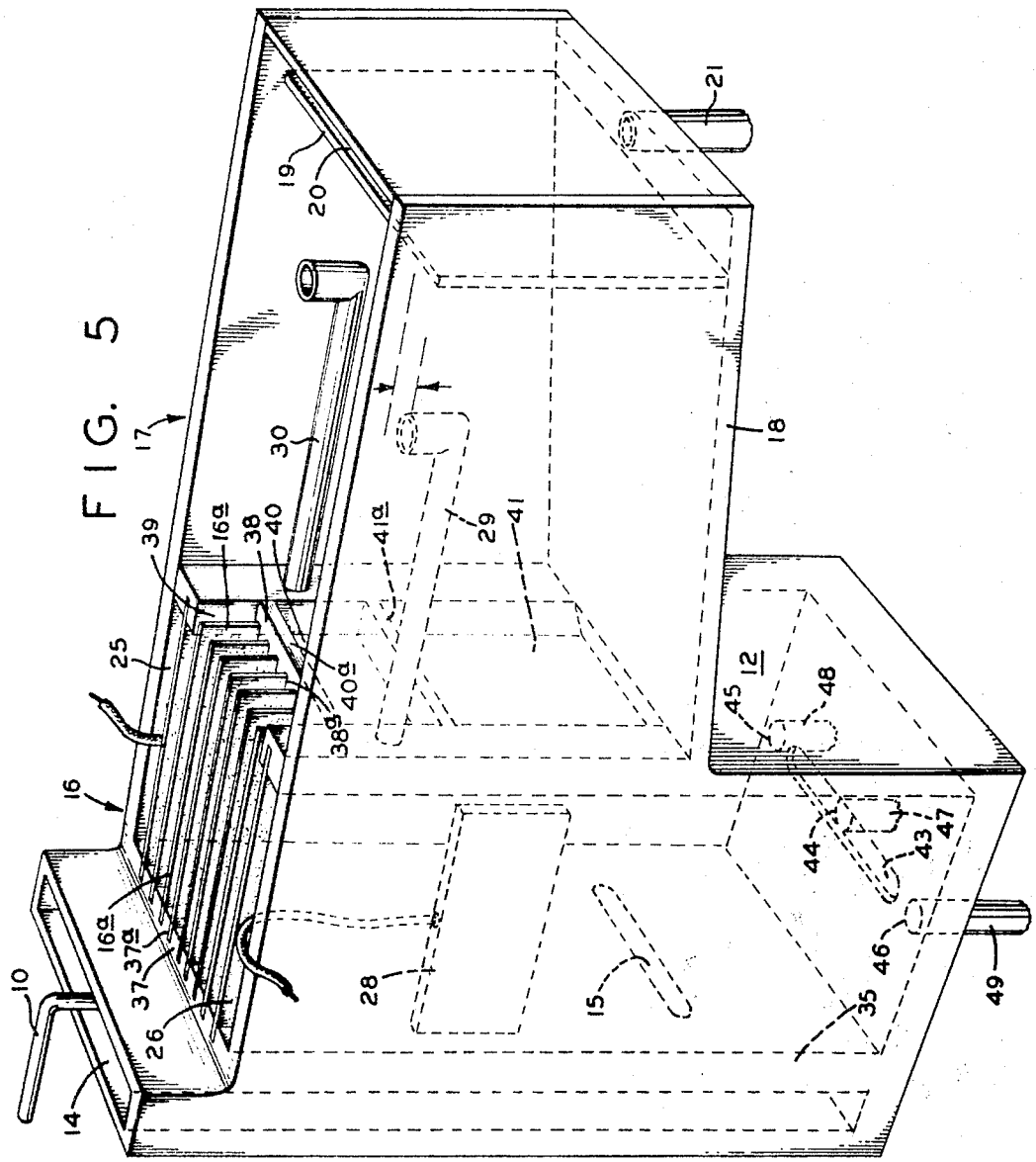

3,461,060
DEMINERALIZATION AND ION TRANSFER APPARATUS
William Joseph Nellen, Little Neck, N.Y., assignor to American Machine and Foundry Company, a corporation of New Jersey
Filed Mar. 7, 1966, Ser. No. 532,318
Claims priority, application Great Britain, Mar. 9, 1965, 9,917/65
Int. Cl. C02b 1/82; B01d 13/02; B01k 3/10
U.S. Cl. 204—301
5 Claims

ABSTRACT OF THE DISCLOSURE

Gravity-type electrodialysis apparatus for batch treatment of water to be purified has permselective membrane stack vertically arranged between pair of electrodes. A reflux tank having a bottom sloping toward the membrane stack communicates laterally with one side thereof. Inlets and outlets are so arranged that after treatment the concentrate layer can be drawn off the bottom, then the remaining supernatant dilute solution displaced up and out by raw water fed in from the bottom.

---

This invention relates to fluid-treating apparatus and more particularly to dialysis and electrodialysis devices.

Specifically, the invention is concerned with a relatively simple and inexpensive batch fractionating apparatus which is suitable, for example, for desalination of water.

The problem of metering the flows in gravity-type electrodialysis stacks with high reliability and minimum cost has heretofore caused considerable difficulty. The present invention avoids this problem by not metering the flows at all, i.e., by using a non-flow system. Although the establishment of a density gradient in a gravity stack from the rather rapid vertical movement and separation of the concentrate and dilute liquid films has been recognized heretofore, the utilization of this principle in accordance with the apparatus of the invention is entirely novel.

Accordingly, by using an open-bottom, open-top gravity stack in a tank of water to be purified, e.g., desalted, the density gradient will be established in the tank with dilute water collecting in the top part of the tank, concentrate at the bottom. The dilute layer can then be drawn off from the top. Similarly, concentrate can be withdrawn from the tank bottom. The wall of the tank can serve as the stack side walls or separate stack sides can be inserted (for smaller stacks in big tanks). In either case, the stack sides serve to limit current by-pass around the membrane area.

While the invention will be described primarily in conjunction with the treatment of brine or brackish water to remove salt and other solids therefrom, it will be apparent that the use of the apparatus of the invention is not limited to such liquids alone.

In general, it is the object of the present invention to provide a relatively inexpensive batch liquid treating device which establishes a density gradient by electrodialysis.

A further object of the invention resides in the provision of a simplified unit in which the electrodialysis stack functions similarly to a radiator in a room in the purification cycle; no pumps or other moving parts, nor complex flow controls are required.

It is another object of the invention to provide an electrogravitational device in which a high degree of separation or fractionation may be achieved in a liquid feed batch.

It is still a further object of the invention to provide a simple, yet extremely effective, liquid treating device which uses the gravity separation principle, is automatic in operation, and requires extremely simple control means.

It is a more specific object of the invention to provide a simple and compact electrodialysis decantation apparatus which may be employed in the home to condition brine or brackish water and which operates by establishing a density gradient in the liquid.

Additional objects, advantages, and features of the invention reside in the construction, arrangement and combination of parts involved in the embodiment of the invention, and its practice and will become apparent from the following description and accompanying drawings wherein:

FIG. 1 is a schematic arrangement illustrating a preferred embodiment of the device in elevation.

FIG. 2 is a plan view of the device.

FIG. 3 is a sectional view taken substantially along line 3—3 of FIG. 1.

FIG. 4 is a fragmentary sectional view taken substantially along line 4—4 of FIG. 1.

FIG. 5 is an enlarged view showing in better detail the elements of the container into which a batch is fed for fractionation.

FIG. 6 is a circuit diagram illustrating the control circuit for automatic operation.

In conventional electrodialysis units, flow of the liquid under treatment through the stack is not only required to minimize polarization effects which enhance precipitation, but, also, treatment is based on the flow rate through the stack. Moreover, even in electrogravitational units controlled flow rates have been used to set the amount of desalting done.

The relatively high cost, particularly with smaller appliances, makes reliable flow control wholly impractical to achieve. For example in using conventional stacks, inlet pressures are regulated, but control is lost if one of the parallel flows paths begins to clog or gas bind.

As another example, in continuous-flow gravity cells, stack pressure drop is not available, and devices, such as capillaries, weirs, or driven water-wheels, are not reliable controllers of very low flow rates over long periods.

Since, in the gravity cell of the invention, flow is not required to provide turbulence as is necessary in conventional electrodialysis stacks, and since genuinely reliable low cost continuous flow controls are unavailable, the idea of "non-flow" batch purification of liquids, e.g., desalination, is extremely attractive. Furthermore, polarization is not detrimental to the operation of the gravity apparatus of the invention.

While batch treatment attempted heretofore has required the pumping of the dilute and concentrate streams through a stack until the desired degree of separation has been achieved, the concept used in the batch-wise operation of the gravity cell of the present invention requiring no pumping is novel and makes possible the development of an extremely simple, reliable, and low-cost appliance.

The invention provides an electrogravitational batch device including a treatment container which houses a stack comprising electrodes, preferably in separate compartments, at the extremities of the container between the electrodes. Membranes extend from opposite walls of the container. The container and electrode compartments have inlet and outlet apertures. Means is used to introduce feed in batches whose quantity is not critical and may vary over fairly wide amounts.

Referring to FIG. 1 of the drawing, the liquid to be treated or purified, such as raw brackish water, for example, is admitted to fill a dialysis stack compartment 12 and the current is turned on. The treating compartment may comprise solely the rectangular part 12 (as viewed in elevation in FIG. 1) or, as depicted, it preferably has appended an auxiliary tank 17 into which liquid freely communicates from stack compartment 12 and which serves to increase the capacity of the device. After a period, the water in the stack compartment 12 as well as in the tank 17, under the electrodialysis action and convection currents set up thereby, becomes substantially demineralized with a relatively dilute fraction occupying approximately the upper part (as well as the major volume) of the stack compartment, and the concentrated portion occupying a substantially lesser volume and comprising the lower, relatively dense, fraction or layer. The concentrate layer in the lower part of compartment 12, generally in a volume of less than about one-third of the rectangular section 12. The effect of electrodialysis and convection on liquid contiguous to stack 16 subjects the entire volume in both containers 12 and 17 to fractionation through the stack so that concentrate stream gravitates at the bottom of container 12. The effect of stack 26 functions in space 12 and 17 in a manner analogous to a radiator in a room. The heavier fraction present in tank 17 flows by gravity down the inclined bottom 18 of tank 17 accumulates at the bottom of compartment 12.

Activated by a suitable control device, such as a timer switch, the lower part of the stack compartment 12 is drained, disposing of most of the concentrate layer. At the same time, the electrode compartments 25 and 26 are drained. Raw feed is fed gradually at 15 into the lower part of the stack compartment 12. The level slowly rises, with the dilute layer or portions still remaining at the top of the solution, not mixing substantially with the incoming raw feed. As the level continues to rise in the stack container 12 and tank 17, the dilute layer spills over a weir 19 into a product tank 22. Preferably before the dilute portion spills over, or at the same time, a minor portion is channelled back, such as through appropriately positioned standpipes 29 and 30, to fill the electrode compartment 25 and 26 with the relatively dilute product. When most or all of the dilute essentially supernatant product of a given batch has been displaced over the top by the incoming feed, the feed is shut off, the current to the electrodes 27 and 28 is turned on, and the new batch in compartment 12 and 17 is again processed separating the batch into a dilute upper portion and concentrated lower portion. The dump-and-refill cycle is repeated until the product tank 22 is full, at which time, by suitable level-sensing device 23 which functions by contacting the liquid surface in the product storage reservoir, further flow of liquid and current is shut off until the product is withdrawn such as through spigot 24, when the batch treating cycle recommences to replace the product liquid withdrawn. A suitable lower limit switch (not shown) may also be employed in the product reservoir to preclude operation until a certain minimum amount has been drawn from reservoir 22. Electrodes 27 and 28 may vary significantly in size, for example, they may have a cross-sectional area of about $\frac{1}{2}$ to about $\frac{1}{20}$ of the compartment cross-section. The electrodes are preferably located near the top of the electrode compartments. The concentrate is suitably withdrawn through manifold 43 and drain 44. Feed of liquid to be processed is admitted through inlet 15 near the bottom of the stack preferably through a turbulence-minimizing arrangement such as the "stilling" chamber 14.

Considered from a flow control standpoint, what is provided is a device which accommodates relatively high flow rates, for short periods of time at the end of each batch processing cycle. This automatic functioning is readily accomplished with conventional inexpensive elements such as cam timers and solenoid valves and contrasts markedly with the extremely difficult task of metering low flow rates continuously (and reliably) with valves or capillaries.

While the apparatus of the invention may sacrifice some efficiency it is nonetheless extremely advantageous because of its simplicity and economy. The means to regulate approximate volumes of feed and product may comprise conventional time-operated valves. With such time devices, even though a change in the feed line pressure would cause a change in the total volume fed to the stack (so that if the pressure were low, not all the product would be pushed over and if too high, some higher salinity water would be pushed over). Such discrepancy may readily be offset by setting the stack voltage high enough so that overly-dilute product is normally produced, rendering minimal the effect of some concentrated product run over. While the flow control design described in the invention is most applicable to a relatively small-size appliance type units of up to about 250 gallons per day, it can be used in considerably larger size apparatus of 1,000 gallons per day or greater to accomplish similar purifications on a larger scale. Since the power consumption of the unit is so low (ca. 20 watts), inefficiencies can be tolerated and yet the design provides an appropriate degree of control over the quality of the product water at a low cost for components.

Flow control may be achieved in the electrode compartments 25 and 26 in the same manner as in the main stack 16, but is even more positive. While the usual electrodialysis stack has a continuously flowing electrode stream to flush out precipitates and gases.

In this apparatus of the invention, the electrode compartments 25 and 26 and the liquid therein are preferably isolated from the liquid in stack container 16 and are open at the top, allowing for easy gas venting. Compartments 25 and 26 are completely drained at a relatively fast flow rate after each batch cycle. It is then preferably re-filled with the most dilute product water available from the stack before the product is discharged to storage, or during the time the product is being discharged. Thus, by sizing the electrode compartments 25 and 26 to hold a volume equivalent to that which would have flowed through if a continuous flow had been used, and by replacing liquid in the electrode compartment with each batch, preferably with dilute product water, the concentration will stay below that at which precipitates form. Nevertheless, the high drain from the electrode compartments insures complete clean-out if any solids do collect.

The stability of the gradient and the surprisingly sharp demarcation between dilute and concentrate zones are utilized in the apparatus of the invention to provide a compact membrane stack which makes possible the simple mode of draining concentrate, introducing feed, and removing product. The demarcation line between the dilute and concentrated product is treated as occurring, more or less, about one-third of the way up from the bottom. Accordingly, at about one-half the vertical height, the water will definitely be in the dilute zone so that a reflux tank 17 which interconnects with the stack container and whose bottom is not below about the one-half vertical distance on tank 12, is used to increase the practical capacity of the batch. As shown, a "reservoir" or reflux tank 17 is provided alongside the upper half of the stack and hydraulically connected to it by large "windows" 39, 40, and 41 in the connecting wall. The salinity gradient is found to form in the reservoir 17 as well as in the stack (membrane area) 12 proper. Convection caused by density and temperature changes results in the entire volume in both containers 12 and 17 being processed. The volume of dilute water in the unit is relatively large compared to the volume of concentrate. All concentrate is drawn out through the bottom of container 12. The manifold 43 carved into the bottom of the stack connects all the cells to a central $\frac{1}{2}''$ drain hole 44. A cam timer such as that depicted as 61 in FIG. 6, opens a solenoid drain valve 54 at and for the proper time to drain out the amount desired through line 47. Simultaneously, the two electrode compartments 25 and 26 are drained completely through outlets 45 and 46 through lines 48 and 49 and the same solenoid valve 54. Suitable check valves 52 and 53 may be used to prevent backflow of liquid withdrawn through line 47 into the electrode compartments through electrode compartment discharge lines 48 and 49.

The liquid feed may be programmed by solenoid valve 11 to enter the unit through feed line 10 after discharge of the concentrate fraction of the product is completed. The feed solenoid valve 11 on the line 10 may be timer-operated to feed the open top "stilling" chamber 14 built on the side wall of the stack container 12. A feed manifold inlet slot 15 preferably at an elevated position from the bottom of the stack container 12 connects chamber 14 with the stack body 12. The stilling chamber 14 acts as a baffle, allows air release time and space, and achieves some heat transfer with the main stack (which aids in air and gas release from the feed). The manifold inlet slot 15 is sufficiently broad to connect with and introduce liquid feed directly to all the cells but not including the electrode compartments 25 and 26. As the feed water enters the stack compartment 12, it fills also compartment or tank 17; the supernatant portion remaining essentially at the top and not mixing substantially with the incoming feed as flow progresses from the upper part of container 12 to the reflux tank 17 and over weir 19. The "windows" 39, 40, and 41 connecting the reflux tank 17 with the upper half of the stack wall 36 opposite the feed slot 15 are almost the full width of the stack. Preferably horizontal "islands" 40a and 41a of a size sufficient to afford support for the membranes 16a of stack 16 and not substantially obstruct free passage between chamber 12 and 17 are provided.

When the level of liquid has risen to within about ⅛" of being full, liquid flows into the electrode compartment standpipe entrances 29a and 30a from the tank 17 and thence into the electrode compartments 25 and 26, filling them. The feed pipes 29 and 30 are preferably designed and positioned to prevent diffusion of liquid from the electrode compartments 25 and 26 into the body of liquids in compartments 12 or 17 as the fractionation proceeds and the concentration increases in these electrode compartments.

When the electrode compartments 25 and 26 have been filled with product water the level in the stack continues to rise, e.g., about another ⅛" and, as mentioned earlier, overflows a weir 19 and passes into the product reservoir 22 via passage 20 and outlet 21. The level switch 23 which senses the level in the product reservoir may be suitably mounted on the bottom of the stack reflux tank so as to extend down into the reservoir. This mounting independent of reservoir 22 allows the reservoir to be removed for easy cleaning.

While in conventional electrodialysis devices stack voltage must be adjusted and controlled within narrow limits, in the batch-operated gravity cell of the invention the voltage settings are far less critical. A "too-high" voltage, instead of producing polarization, merely causes a faster desalination of the batch to a low level of salinity. Moreover, excess voltage is not significant, since the power level is only in the range of about 20 watts normally.

To aid in cleaning the electrodes, current reversal may be employed. Noteworthy in the usual electrodialysis stack there is a sharp rise in current upon reversing polarity; the current then slowly drops as the operation approaches a steady state condition. With the batch gravity stack of this invention, the polarity is preferably reversed after the electrode cells have begun to drain, only part of the electrode is then submerged and conductive, resulting in relatively low current drain. As the electrode compartment refills, the electrodes are only partly submerged. Therefore, the current drain is still relatively low. By the time the electrodes are fully submerged in the new batch, the stack condition is no longer in danger of high current drain. The time lag to get the stack to full operating condition also operates advantageously to prevent danger of high current surge. It is thus seen that noteworthy advantages reside in the fact that the power supply need not be sized for the intermittent peak current, or, on the other hand, a separate current-limiting device often necessary in prior art need not be employed.

Preferably permselective membranes 16a are used to hydraulically seal the electrode compartment 16b from the body of the stack and they should be of suitable thickness and stiffness so as to be easy to insert into slots 37a and 38a formed in slotted elements 37 and 38.

It may be desirable to seal the membranes in place. Permselective membranes are well known and have the ability to permit the transfer of the proper ion to the exclusion of the ion to be rejected. Thus, in the desalting of water, for example, cationic permselective membranes are preferably employed while in sweetening citrus juice, for example, anionic permselective membranes are preferred. It will be understood, however, that combinations of anionic and cationic as well as membranes which are essentially neutral, such as polyethylene sheet, may be employed. One expedient method of sealing the electrode compartments (membranes) is to pot the membrane sides and bottom in the slots with silicone rubber cement. Alternatively, it may be preferable to seal the membrane in a plastic frame (not shown) and slide the frame into tight slots 37a and 38a. Because it is inconvenient to work with a membrane of the kind which cannot be wetted and dried, a membrane which is wettable and and can be dried repeatedly is preferable. Also, a chemically-resistant membrane may be employed at the electrodes if, for example, it is found in membrane life tests that electrode products attack normal membranes.

Suitable membranes which may be used, for example, are those having backbones of olefinic or halo olefinic polymers. An additional advantage of the apparatus of the invention resides in the case of replacing membrane. The unit is open at the top and replacement of membrane can be quickly accomplished by lifting out the worn or deteriorated membrane and inserting the new.

If desired to minimize short circuiting which may occur in the more concentrate layer near the bottom of the stack, one or more of the membranes may have a lower segment or skirt which is non-conductive. This has the effect of providing an electrical barrier and forces current to flow through the upper part of the stack 16 where it is more effective, i.e. it improves the current efficiency in processing the batch.

The electrodes are of conventional kind and may be suitably formed by material comprising, for example, 100 microinches of platinum, plated on one side of 20 mil titanium sheet. The titanium side may be fastened to the stack with a suitable sealant or adhesive composition. The electrode need only be about ⅓ the cross-sectional area of the compartment or less and is preferably placed in the upper part of the electrode chamber.

The membranes 16a are held in vertical position and at the desired spacing by suitable retainers such as by sliding them into vertical grooves, e.g., about ¼" deep in the walls of the stack or in a separate piece contiguous thereto. The spacing of membranes as determined from experience may vary somewhat. Spacing of about ½ inch or greater may be used, although spacing of about ⅜" gives desirable results. At closer spacings, where the membrane height is about 6 inches, for example, the vertically-moving concentrate and dilute films sometimes interfere with each other, causing mixing.

Although a specific arrangement has been shown, wherein the membrane is retained at its ends, any method of holding the membranes 16a in a reasonably vertical position is satisfactory, so long as it does not obstruct the surface of the membrane. Edge slots, hanging, and festooning are some acceptable methods.

A suitable wiring schematic for automatic operation of the apparatus of the invention is shown in FIG. 6. As seen therein, a source of alternating current electric power is supplied at 56. A level sensing switch 23, hereinbefore referred to, is connected in the line and functions to disable the entire circuit when a predetermined level is accumulated in the product reservoir 22.

The connection to the electrodes 25 and 26 in the electrodialysis stack is shown connected to timer switch 64 which functions periodically to reverse current to the stack. Transformer 57 and the rectifier 58 are included to furnish the necessary direct current power to the stack. A suitable switch 59 operated from the cam timer 61 serves to activate the feed solenoid 11 for a pre-determined time interval to feed a batch into the processing compartments 12 and 17. Current passing through electrodes 27 and 28 is programmed to follow a time interval and is then reversed by switch 64. When this predetermined time interval for suitably processing a batch has elapsed the two pole double throw switch 64 comprising single pole double throw elements 62a and 62b and 63a and 63b, which is arranged for two pole double throw operation by a cam of timer 61, will reverse the current polarity to the stack. As the timer is arranged for repetitive cycling, the contacts of 64 will revert to the electrodializing positions shown in the diagram. Current reversal may be made to occur at an opportune time but as heretofore considered, it preferably takes place during evacuation and refilling of the electrode compartments. After a suitable processing time the switch 60 is actuated to operate the drain solenoid valve 54 for a period of time sufficient only to evacuate the concentrated fraction collected in the bottom part of stack container 12. Thereafter, the valve 54 closes and swich 59 is again actuated to introduce an additional quantity into the system through the energization of solenoid valve 11 in amounts sufficient to make one batch of products, that is, sufficient to overflow the dilute product fraction over weir 19. This cycle of timed sequence is continued alternately opening and closing valve 54 until the desired level is reached in the product reservoir 22, when switch 23 cuts off the current to the entire system.

It will be apparent to those skilled in the art that various modifications may be made herein, without departing from the scope of the invention. Accordingly, the invention is not to be limited except insofar as required by the appended claims.

I claim:

1. An apparatus for batch treatment of liquids comprising in combination, a container, a stack comprising a plurality of spaced membranes positioned in said container at least some of which are permselective, said membranes being disposed so as not to substantially obstruct the vertical movement of liquid contiguous to said membranes in fractionating said liquid into an upper dilute layer and a lower concentrated layer, a pair of electrodes housed in separate compartments, said electrodes disposed so that said stack is positioned between them and said compartments being provided with suitable outlets permitting them to be completely evacuated after processing each batch and to be thereafter filled for the next batch with liquid from said upper layer as a new batch is introduced at an inlet in said container, said inlet being positioned in said container to admit liquid feed below the midportion of said stack, a lower outlet in said container to permit withdrawal of a first relatively concentrate layer, said container being provided with a reflux tank connected to and coextensive with the upper part of said container and allowing free passage of liquid to and from said container, said tank having a bottom inclined toward said container and being provided with a weir which comprises the upper outlet to permit withdrawal of the upper relatively dilute layer, said tank being further provided with a pair of standpipes leading to said electrode compartments, said standpipes having their respective inlets positioned below the top of said weir, thereby permitting said electrode compartments to be filled with liquid from said tank before the liquid spills over said weir, and means to substantially limit the volume of liquid evacuated from the lower outlet from the lower layer of liquid from a given batch present in said container to a volume substantially that of the volume of the upper layer of a prior batch.

2. The apparatus of claim 1, in combination with a product storage reservoir and wherein said means to limit the feed and evacuation of liquid are automatically controlled and are co-ordinated with the level of the product in said storage reservoir and wherein said storage reservoir is provided with a level switch which prevents further flow of liquid when said storage tank contains a predetermined level of liquid.

3. The apparatus of claim 1 in combination with an automatic current reversing device which initiates reversal of current as the electrode compartments are evacuated.

4. The apparatus of claim 1, wherein said lower outlet in the container and the outlets in said eletcrode compartments are connected so that liquid from all three outlets is withdrawn from a single valve.

5. An apparatus for batch treatment of liquids comprising in combination, a container, a stack comprising a plurality of spaced membranes positioned in said container at least some of which are permselective, said membranes being disposed so as not to substantially obstruct the vertical movement of liquid contiguous to said membranes in fractionating said liquid into an upper dilute layer and a lower concentrated layer, a pair of electrodes housed in separate compartments, said electrodes disposed so that said stack is positioned between them and said compartments being provided with suitable outlets permitting them to be completely evacuated after processing each batch and to be thereafter filled for the next batch with liquid from said upper layer as a new batch is introduced at an inlet in said container, said inlet being provided with a liquid accumulator to minimize turbulence of liquid fed into said container, said inlet being positioned in said container to admit liquid feed below the midportion of said stack, a lower outlet in said container to permit withdrawal of a first relatively concentrate layer, said container being provided with a reflux tank connected to and coextensive with the upper part of said container and allowing free passage of liquid to and from said container, said tank having a bottom inclined toward said container and provided with a weir which comprises the upper outlet to permit withdrawal of the upper relatively dilute layer, said tank being further provided with a pair of standpipes leading to said electrode compartments, said standpipes having their respective inlets positioned below the top of said weir thereby permitting said electrode compartments to be filled with liquid from said tank before the liquid spills over said weir, and means to substantially limit the volume of liquid evacuated from the lower outlet from the lower layer of liquid from a given batch present in said container to a volume substantially that of the volume of the upper layer of a prior batch.

References Cited

UNITED STATES PATENTS 3,099,615   7/1963   Kollsman _____ 204—180

JOHN H. MACK, Primary Examiner

A. C. PRESCOTT, Assistant Examiner

U.S. Cl. X.R.

204—180